United States Patent [19]

Nakanishi et al.

[11] Patent Number: 4,894,924
[45] Date of Patent: Jan. 23, 1990

[54] METHOD FOR MEASURING LEVEL OF LARGE STRUCTURE

[75] Inventors: Takenori Nakanishi, Tokyo; Sumio Honma, Funabashi; Takao Nishizawa; Takuo Mizutani, both of Tokyo, all of Japan

[73] Assignee: Ishikawajima Kensa Keisoku Kabushiki Kaisha, Japan

[21] Appl. No.: 275,688

[22] Filed: Nov. 23, 1988

Related U.S. Application Data

[63] Continuation of Ser. No. 68,522, Jul. 1, 1987, abandoned.

[30] Foreign Application Priority Data

Nov. 7, 1986 [JP] Japan .................................. 61-265361

[51] Int. Cl.⁴ ............................................... G01C 5/04
[52] U.S. Cl. ........................................ 33/367; 73/311; 73/313
[58] Field of Search ................. 33/367, 377, 378, 366; 73/311, 319, 313, 308

[56] References Cited

U.S. PATENT DOCUMENTS

| Re. 13,240 | 5/1911 | Gutwein | 33/367 |
|---|---|---|---|
| 3,117,381 | 1/1964 | Durkin | 33/367 |
| 3,849,898 | 11/1974 | Turloff | 33/367 |
| 3,949,484 | 4/1976 | Cluley et al. | 33/367 |
| 4,041,613 | 8/1977 | Bishop | 33/367 |
| 4,466,284 | 8/1984 | Dumery | 73/313 |
| 4,581,931 | 4/1986 | Robotti et al. | 33/367 |
| 4,686,773 | 8/1987 | Brewer | 33/367 |

FOREIGN PATENT DOCUMENTS 1051372 10/1983 U.S.S.R. ................................. 33/367

Primary Examiner—William A. Cuchlinski, Jr.
Assistant Examiner—Patrick R. Scanlon

[57] ABSTRACT

Displacement sensors which are communicated with a stationary reference side are placed at the measuring points of a large structure. Displacement at each measuring point is electrically measured by utilizing the fact that the liquid levels at the stationary reference side and each measuring point are at the same level.

1 Claim, 5 Drawing Sheets

METHOD FOR MEASURING LEVEL OF LARGE STRUCTURE

This application is a continuation of application Ser. No. 07/068,522, filed July 1, 1987 and now abandoned.

BACKGROUND OF THE INVENTION

The present invention relates to a method for measuring the level of a large structure such as a bridge.

In recent construction or reconstruction of a large bridge or the like, the latter is composed of block assemblies and is assembled in such a manner that every time when each block is mounted, displacement of the thus partially constructed large structure is measured.

In construction of a bridge or the like, major sections or blocks may deflect partially or over the whole length thereof due to environmental conditions such as variation of loads. Especially in recent construction of a large bridge or the like, the span between upright bridge piers erected from the ground surface or the bottom of a river is considerable so that when individual blocks are interconnected into a unitary construction, it becomes one of technical factors in the construction to estimate the local or overall deflection of a large structure from detected deflections of the major structural blocks or from detected variations in level at specific points. Measurement of such deflections in construction of a bridge as long as, say, 1km or more, which is generally carried out during the night, will take a long period of time and many measurement steps so that the measurement and the processing of the measured data become very cumbersome.

A simple method for measuring deflections of a bridge or the like described above is a so-called water leveling method which has been widely used.

FIG. 1 is a view used to explain the general principle of the water leveling method. Measuring pipes b and c are connected to respective ends of a length of tube a. The measuring tube b is installed on a supporting stand g which is disposed at a measuring point e and has a measurement indication line f above the measuring point e while the other measuring tube c is so disposed as to be movable along a scale j installed at a reference measuring point i on the stationary side h (the ground or a main pier) with known altitude.

For measurement, operators are assigned to the measuring point e and reference measuring point i, respectively, and the measuring tube c at the reference measuring point i is moved upwardly or downwardly so that the liquid level in the measuring tube b at the measuring point e may coincide with the measurement indication line f. When the liquid level coincides with the measurement indication line f, the operator reads out the height of the liquid level in the measuring tube c from the scale j.

Thereafter the measurement is repeated in a manner substantially similar to that described above to read out a graduation. When the graduation thus measured is found to be different from the graduation obtained in the first measurement, you will know that the point e on the bridge d is displaced upwardly or downwardly by a height equal to the difference between the graduations read out in the first and second measurements.

In measurement of displacement of a bridge or the like, leveling measurements on the sides of the bridge and at a position on a center line thereof are repeated every a few to 30 meters (as needs demand) in the longitudinal direction of the bridge so that every time when the measurement is made, the operator moves the measuring tube b and the supporting stand g to the next measurement point.

In the above-mentioned method, two operators are required on the side of the measurement point e and the reference point i, respectively, and a further operator is needed to record the measurement data. Thus, this method needs the operators and a long period of measurement time. In addition, such measurements as described above are generally carried out near midnight in order to eliminate displacements caused by the solar energy during the daytime so that the measurement efficiency is very low. In addition, because reading of the coincidence of the liquid level in the measuring tube b with the measurement indication line f and the reading of the scale j are visually made by the operators so that not only measurement errors but also failure in recording the measurement data tend to occur from time to time. Furthermore, since the measurement is carried out during the night, an illumination system must be used so that the measurement operation becomes harder. Moreover, from the standpoint of operation efficiency and reliability of the measurement data, there arises the problem that the communication between the operators in order to confirm the coincidence of the liquid level in the measuring tube b with the measurement indication line f becomes difficult when the distance between the measurement point e and the reference point i is increased.

The present invention was made to overcome the above and other problems encountered in the conventional water level measurement methods and has for its object to provide a method for measuring displacements at various points on a large structure such as a bridge in an efficient manner within a short period of time with a high degree of accuracy by utilizing the water leveling method.

The above and other objects, effects and features of the present invention will become more apparent from the following description of preferred embodiments thereof taken in conjunction with the accompanying drawings.

DETAILED DESCRIPTION OF THE PREFERRED EMBODIMENTS

Briefly stated, according to the present invention, displacement sensor means comprising a float floating at the liquid level of a liquid tube, a movable indicator movable upwardly or downwardly in unison with said float j and a sensor supported on a stationary member for detecting the displacement of said displacement indicator is disposed at a measurement point of a large sturcture whose level is to be detected. The lower end of the liquid tube is communicated through a liquid distribution line with a vessel which is disposed on a reference stationary side which is not vertically movable so that the level of the measurement point is electrically measured by utilizing the fact that the liquid level in said vessel and the liquid level in the liquid tube disposed at the measuring point are always at the same level.

Furthermore, according to the present invention, the measurement mode is switched between the case in which the levels at a plurality of measurement points on a large structure are substantially the same and the displacements of levels are relatively small and the case in which it is expected that the levels of a plurality of measurement points are considerably different from the initial states or the displacements are great, so that the measurement process becomes very efficient and the measuring system can be simplified.

Figure 1:
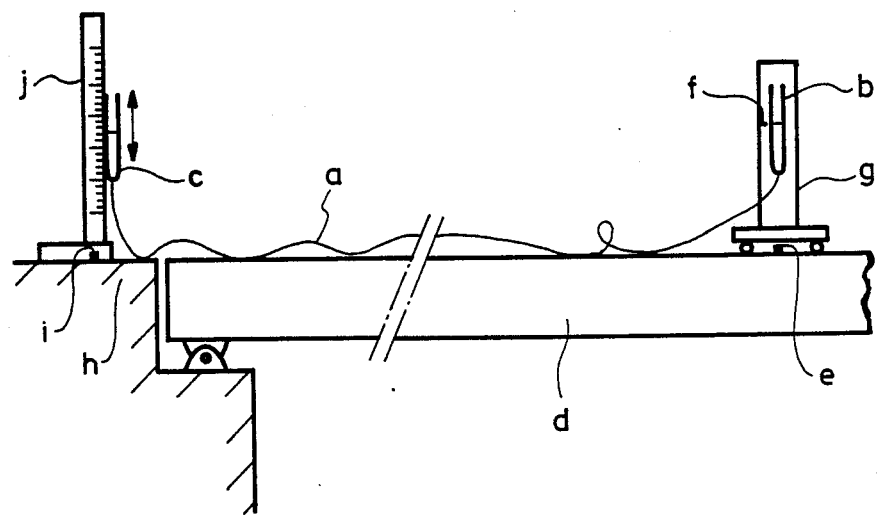
FIG. 1 is a schematic view used to explain a conventional water leveling method.
Figure 2:
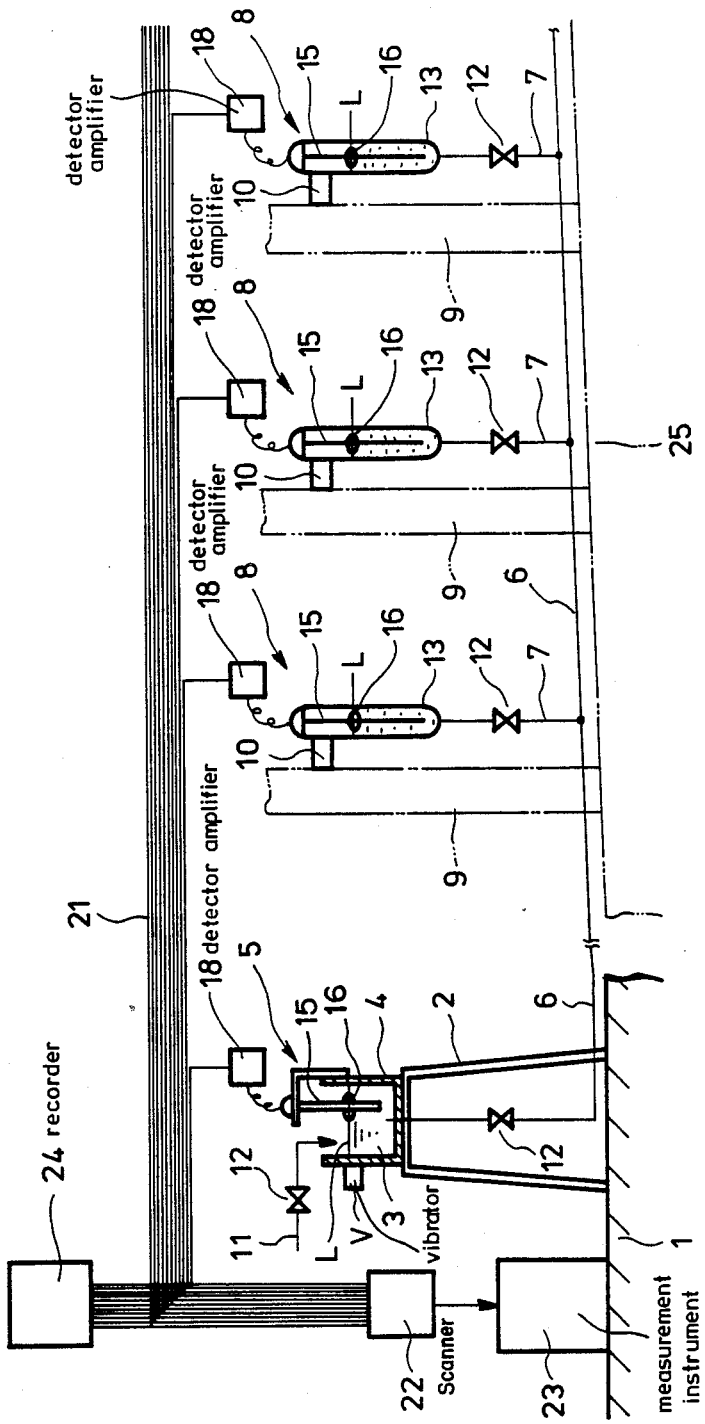
FIG. 2 is a view used to explain a first embodiment of the present invention.

FIG. 2 shows a first embodiment of the present invention used when the levels at a plurality of measurement points are substantially the same and the displacements of levels are relatively small. A tank 4 containing a body of measuring liquid 3 is disposed on a stand 2 which in turn is disposed on a reference stationary side 1. Reference liquid-level sensor means 5 is mounted on the tank 4.

A liquid distribution line 6 is communicated with the tank 4 and a plurality of displacement sensor means 8 are disposed in parallel with each other and communicated with the liquid distribution line 6 through upright lines 7, respectively. The displacement sensor means 8 are securely mounted on structural components 9 such as handrails, girders and beams of a bridge 25 with mounting members 10 such as mounting fixtures, bands or the like and are spaced apart from each other by a predetermined distance. In FIG. 2, reference numeral 11 represents a liquid supply line for supplying the measuring liquid into the tank 4; and 12 designates valves.

Figure 3:
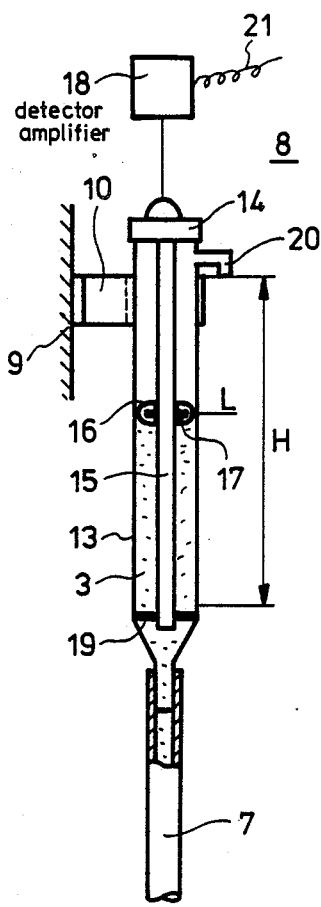
FIG. 3 is a detailed view used to explain displacement sensor means.

FIG. 3 shows one example of displacement sensor means 8. The displacement sensor means 8 comprises a liquid tube 13 whose lower end is communicated with the upright line 7, a probe 15 whose upper end portion is securely joined to an upper end cap 14 of the liquid tube 13 and whose lower end portion extends by a predetermined length coaxially of the liquid tube 13, a float 16 vertically movable along the probe 15 within the liquid tube 13, and a detector amplifier 18 for generating a signal representative of the position of a position sensing magnetic head (displacement indicator) 17 incorporated in the float 16. In FIG. 3, reference numeral 19 designates a ring securely joined to the liquid tube 13 so that the probe 15 can be maintained coaxially of the liquid tube 13 with a predetermined allowance. The ring 19 is formed with a suitable number of holes for permitting the flow of the measuring liquid therethrough. Reference numeral 20 denotes an opening formed at the upper portion of the liquid tube 13.

The reference liquid-level sensor means 5 comprises a probe 15 extending in the body of the measuring liquid 3 and securely joined to the tank 4, a float 16 vertically movable along the probe 15, a magnetic head 17 and a detector amplifier 18.

Detection signals from the detector amplifiers 18 of the sensor means 5 and 8 are transmitted through a signal cable 21 to a scanner 22 disposed on the side of the reference stationary side 1 and then to a measurement instrument 23 adapted to store the transmitted detection signals and to carry out arithmetic operations of them so that the displacements are displayed and recorded. Furthermore, there is a recorder 24 for successively recording (and concurrently displaying) the signals transmitted from the sensor means 5 and 8.

The sensor means 8 are respectively installed at a measuring point on the bridge 25; the height of the sensor means 8 is so adjusted that the liquid level L (that is, the position of the float) is maintained at the midpoint of the effective detection length H (that is, the allowable displacement length of the float) of the displacement sensor means 8 or at a suitable level within the effective detection length H when the vertical displacement of the liquid is expected. Thereafter the displacement sensor means 8 is securely attached to the structural component 9 with the mounting fixture 10 (as shown in FIG. 2).

With this arrangement, the tank 4 is communicated with the liquid tubes 13 in the displacement sensor means 8 through the liquid distribution line 6 and the upright lines 7 so that the displacement sensor means 5 and 8 have the same liquid level L and consequently the floats are located at the same height.

Under these conditions, the detection signals from the sensor means 5 and 8 are sequentially switched and applied to the measuring instrument 23 so that the position of the magnetic head 17 in the float 16 relative to the probe 15 is stored and recorded.

In the case of the measurement of the displacement of the bridge 25 during or after construction of the same, the detection signals from the sensor means 5 and 8 are applied through the scanner 22 to the measuring instrument 23 and are compared with the previously stored detection signals and the differences are recorded.

When the measuring point on the bridge 25 is vertically displaced, the liquid tube 13 securely joined to the structural component 9 is displaced simultaneously. However, the liquid level L is not varied so that the position of the float 16 relative to the probe 15 varies and this displacement is read out by the measuring instrument 23 as a displacement of the measuring point.

When the quantity of liquid within the tank 4 varies during the above-mentioned measurement process, the liquid level L varies; but as described above, the level L within the tank 4 has been detected by the reference liquid-level sensor means 5 and then stored so that in the next measurement, the displacement of the liquid level L can be detected. Therefore it becomes possible to detect a correct displacement by adding or subtracting the displacement to and from the detected displacement at each measuring point. When the area of the free surface of the liquid in the tank 4 is by far greater than the sum of the areas of the free surfaces of the liquid in the displacement sensor means 8 and when the displacement of the liquid level in the tank 4 in response to the variation in liquid level in the sensor means 8 is small and therefore is negligible, the reference liquid-level sensor means 5 may be eliminated.

In the first embodiment, a vibrator V may be mounted on the tank 4 so as to vibrate the body of measuring liquid 3, whereby any difference in liquid level between the tank 4 on the one hand and the displacement sensor means 8 on the other hand are eliminated; upward floating and vanishing of any air bubbles produced are facilitated; and response time required for stabilization of the variation in liquid level due to the vertical movement of the displacement sensor means 8 is accelerated so that correct measurement is ensured.

According to the above-mentioned method, displacements occurring at tens or hundreds of measuring points can be measured within a few seconds with an extremely high degree of accuracy.

Figure 4:
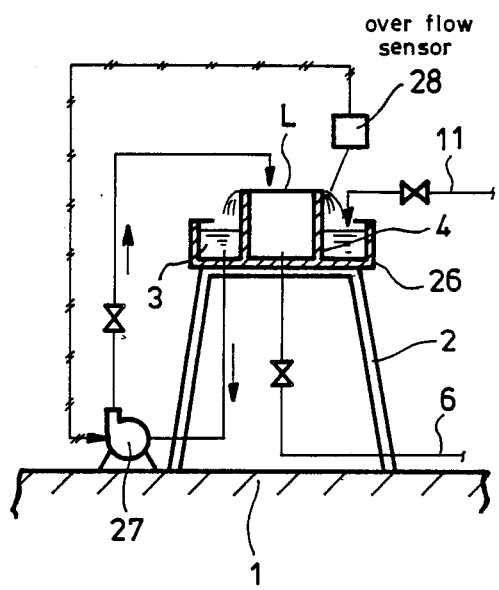
FIG. 4 is a view used to explain a vessel in which a liquid level is kept constant by utilizing an overflow mode.

As shown in FIG. 4, a liquid-receiving tank 26 may be formed around the outer cylindrical surface of the tank 4 which is communicated with the liquid distribution line 6. The measuring liquid 3 in the liquid-receiving tank 26 is returned into the tank 4 through a pump 27 so that during the measurement the liquid in the tank 4 is permitted to overflow and consequently the liquid level L can be maintained constant. Reference numeral 28 designates an overflow sensor for detecting whether or not the measuring liquid is overflowing.

With this arrangement, the liquid level L can be maintained at a predetermined level and will not vary so that any reference liquid level measuring instrument on the tank 4 can be eliminated and the displacements can be obtained merely by reading the positions of the floats 16 of respective displacement sensor means 8 and comparing them with the stored data.

In the above-mentioned embodiments, the present invention has been described in connection with the case in which the levels at a plurality of measuring points are almost the same; but it is to be understood that when a plurality of displacement sensors which are disposed at a plurality of measuring points at which the levels are almost the same are read out as a block, a great many measuring points at which the levels are considerably different from each other can simultaneously be measured.

Figure 5:
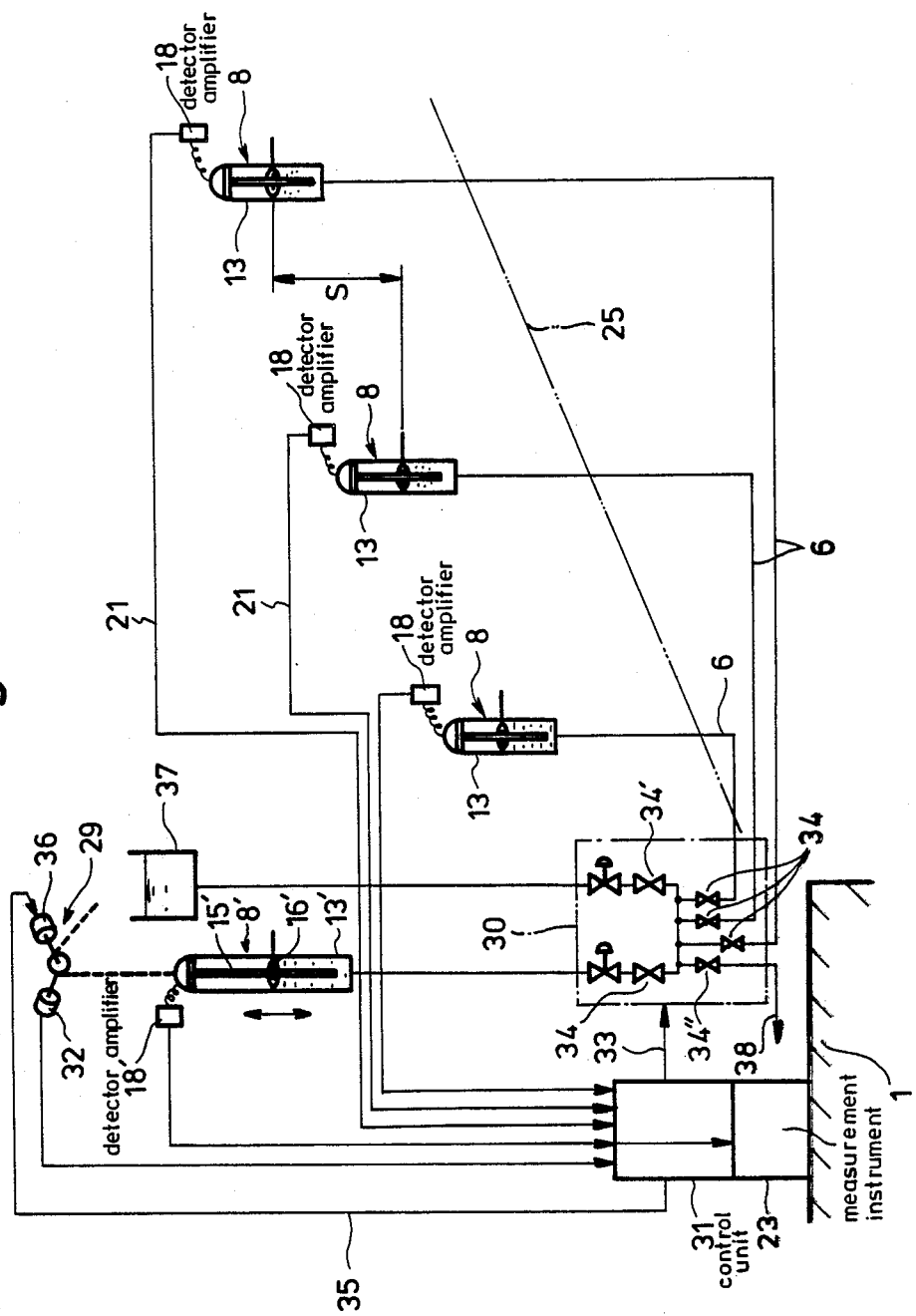
FIG. 5 is a view used to explain a second embodiment of the present invention incorporating a lift.

FIG. 5 shows another embodiment of the present invention applied to the level measurement when the levels or displacements of a plurality of measuring points are expected to be considerably different from each other in the vertical direction. A plurality of displacement sensor means 8 are disposed at a plurality of measuring points on a bridge 25 where the levels are greatly different from each other (as indicated by S). Furthermore, liftable sensor means 8' which is substantially similar in construction to the displacement sensor means 8 and which can be vertically moved by a lift 29 is disposed on the reference stationary side 1. The liquid tubes 13 and 13' of the sensor means 8 and 8' are intercommunicated with each other through the liquid distribution lines 6 and a switching unit or means 30.

The sensor means 8 and 8' are connected through the detector amplifiers 18 and 18' and signal cables 21 to a control unit 31. The detection signal from the sensor means 8' is also applied to the measuring instrument 23.

The detection signal from a vertical position sensor 32 such as a rotary encoder adapted for detecting a vertically displaced position of the sensor means 8' by the lift 29 is applied to the control unit 31. In response to a switching signal 33 delivered from the control unit 31, switching valves 34, make-up feed valve 34' and a drain valve 34" within the switching unit 30 are opened or closed; and in response to the drive signal 35, a drive motor 36 in the lift 29 is energized. Thus the valves 34, 34' and 34" and the drive motor 36 are automatically controlled. In FIG. 5, reference numeral 37 designates a liquid supply tank; and 38, a drain pipe.

In level measurement, after the liquid is supplied and all the valves 34 are closed, the drive motor 36 is energized so that the height of the sensor means 8' above the reference stationary side may become substantially equal to the height of one of the displacement sensor means 8. Thereafter the selected sensor means 8 and the liftable sensor means 8' are intercommunicated through the liquid distribution line 6 by opening the corresponding valve 34. Next the drive motor 36 is energized to vertically move the liftable sensor means 8' on the side of the reference stationary structure 1 in such a way that the liquid level in the liquid tube 13 at the measuring point coincides with the measurement level (for instance, the point 0 at which the mid-point in the vertical direction of the magnetic head 17 coincides with the mid-point in the vertical direction of the probe 15). That is, the operation is carried out for always maintaining the distance between the measuring point on the bridge 25 and the liquid level in the liquid tube 13 of the displacement sensor means 8 at a predetermined distance. In this case, because the detection signal from the sensor means 8' is applied to the control unit 31, the drive motor 36 may be controlled in response to the digital display of the detection signal or the above-mentioned 0-point adjustment may be carried out automatically by operating buttons on the control unit 31.

The liquid levels in the liquid tubes 13 and 13' are always at the same level so that when the measurement level is attained, the height of the liquid tube 13' is read out by the rotary encoder 32 and the liquid level in the liftable sensor means 8' is read out by the position of the float 16' in the liquid tube 13' relative to the probe 15'. The measurement results are stored in the measuring instrument 23.

After a predetermined time interval and after the completion of a required operation, the measurement is repeated in the same manner and when the measurement result is different from the stored result of the preceding measurement, any difference between them is determined as the displacement at the measuring point and is displayed by the measuring instrument. The detection data thus obtained may be outputted by a printer or the like (not shown) connected to the measuring instrument 23.

In the case of the level measurement at a plurality of measuring points by a plurality of displacement sensor means 8 each disposed at a measuring point, and in which only the valve 34, inserted in the liquid distribution line 6 communicated with the liquid tube 13 which measures the level is opened in response to the switching signal 33 delivered from the control unit 31 by operating the buttons thereon the measurement is sequentially repeated so that the efficient switching can be ensured and the level at each measuring point can be measured successively.

Figure 6:
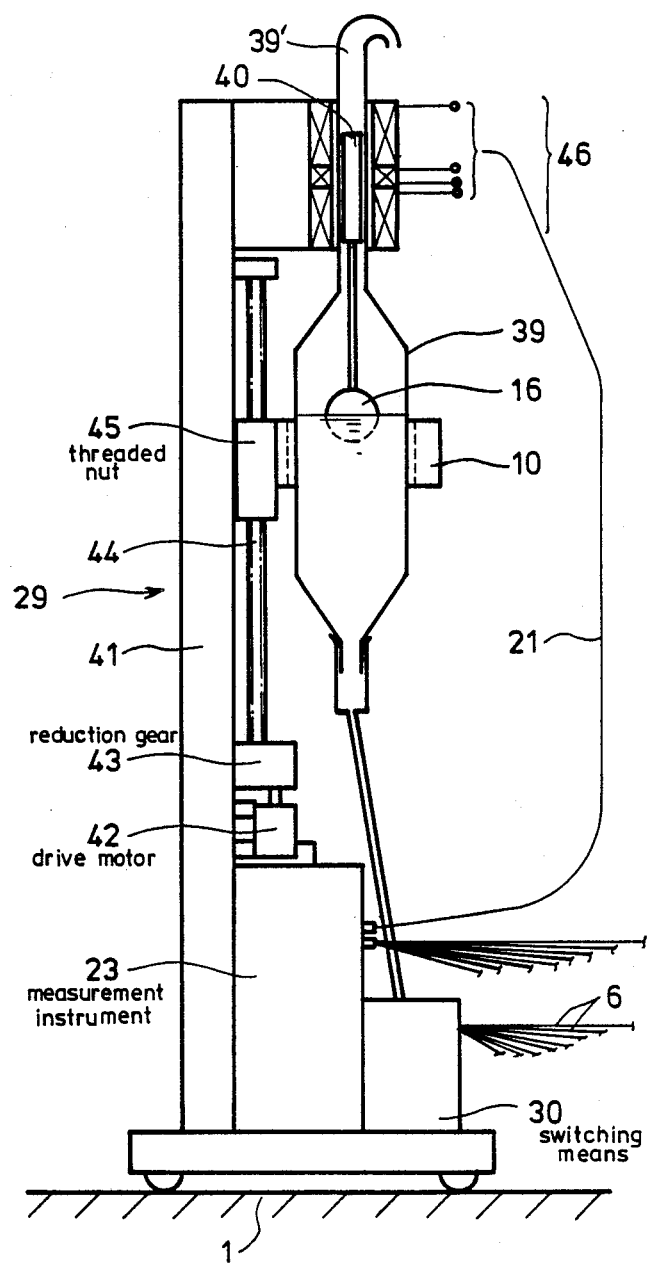
FIG. 6 is a view used to explain another displacement sensor means and lift.

FIG. 6 shows another construction of the displacement sensor means as well as another construction of the lift. The displacement sensor means 8 has therein a float 16 as well as a displacement indicator 40 such as an iron core which is vertically movable in unison with the vertical movement of the float 16 within a small-diameter tube 39' which in turn extends upwardly from the upper end of the liquid tube 39 and is communicated with the surrounding atmosphere.

A lead-screw 44 which is rotated through a reduction gear 43 by a drive motor 42 is vertically supported by a detection column 41 and passes through a threaded nut 45 in such a way that upon rotation of the lead-screw 44, the nut 45 is displaced upwardly or downwardly. The liquid tube 39 is securely joined to the nut 45 through a mounting fixture 10, whereby the lift 29 is provided. A sensor 46 is attached to the upper end portion of the column 41 in such a way that it surrounds the small-diameter tube 39' extending upwardly from the upper end of the liquid tube 39 in order to detect a vertical position of the displacement indicator 40 without contact with the liquid level by utilizing an electric method using a differential transformer, a method using a high-frequency detector or a method using ultrasonic waves or a laser beam. The detection output signal from the sensor 46 is transmitted through a signal cable 21 to the measurement instrument 23 mounted on the stand.

According to the level measurement method of the present invention, the measurement is immediately made when required regardless of whether it is day or night and the resultant measurement data can be compared with the previous measurement data so that the displacement at each measuring point can be obtained. Furthermore, as described above, in the level measurement, a suitable measurement method may be selected depending upon the level, displacement and so on of a large structure so that the efficient and stable measurement can be ensured.

The present invention is not limited to the above-described embodiments, but various modifications may be made without leaving the scope of the present invention. For instance, the present invention may be equally applied to the measurement of displacements at a great many points on viaducts for railway or highway traffic, roads, marine and port installations in addition to bridges. Instead of detecting the position of the float by the probe, other suitable detection methods utilizing high frequency waves or ultrasonic waves or optical methods utilizing a laser beam or the like may be used to ensure the measurement with a high degree of accuracy. The measuring liquid may be water, an anti-freezing agent, oils and so on. The number of measuring points is not limited. The vertical position of the vessel itself may be varied.

As described above, according to the level measurement method of the present invention, the displacement sensors which are communicated through the liquid distribution line or lines with the reference stationary side are placed at the measuring points; the liquid level in each displacement sensor is detected by an electrical method or any other suitable methods; the detected result is stored and compared with the result of the succeeding detection to measure the displacement at each measuring point so that the measurement operation can be automatically and efficiently carried out during daytime or at night and the number of required operators can be reduced. Furthermore, the measurement with a high degree of accuracy is ensured and calculations, storage and display can be made by the measuring instrument so that the measurement operation can be considerably facilitated.

What is claimed is:

1. A method of measuring vertical displacement of a large structure relative to a stationary reference point, comprising the steps of: placing at the stationary reference point a vessel having an upper portion open to atmosphere; disposing reference liquid-level sensor means in said vessel; said reference liquid-level sensor means comprising a liquid-level sensor body vertically secured in said vessel, a float around an outer periphery of the sensor body and vertically movable with the level of a liquid in said vessel, and a displacement indicator vertically movable in unison with said float; placing a plurality of liquid tubes respectively at a plurality of measuring points of said large structure and substantially at the same level as said vessel, each of said liquid tubes having an upper portion open to atmosphere and communicating with said vessel through liquid distribution line means; disposing displacement sensor means in each of said liquid tubes; said displacement sensor means comprising a liquid-level sensor body secured centrally in the respective liquid tube, a float around an outer periphery of the last-mentioned sensor body and vertically movable with the liquid level in the respective liquid tube, and a displacement indicator movable in unison with said last-mentioned float; effecting electrical detection of the liquid level by said reference liquid-level sensor means and said displacement sensor means; generating a measuring point liquid level initial output signal for each measuring point using the displacement sensor means at each measuring point, generating a reference liquid level initial output signal for said reference point using the reference liquid-level sensor means at the reference point; storing the initial output signal from said reference liquid-level sensor means and the initial output signals from said displacement sensor means in a storing means; and thereafter re-effecting electrical detection of the liquid level using said liquid-level sensor means and said displacement sensor means liquid tubes and generating further measuring point liquid level output signals for each measuring point, and detecting displacements at the measuring points by comparison of the further measuring point liquid level signals to the initial measuring point liquid level output signals stored in said storing means and correcting for any variation of the reference point liquid level by re-effecting electrical detection of the reference point liquid level using the reference point liquid-level sensor means, generating a further reference point liquid level output signal, comparing the further reference point liquid level output signal to the initial reference point liquid level output signal stored in the storing means, defining a correction factor which corresponds to the difference between the further reference point liquid level output signal and the initial reference point liquid level output signal, and applying the correction factor to the further measuring point liquid level output signals.

* * * * *